Nov. 24, 1959     W. E. BELLER     2,914,086
VALVE DEVICE
Filed Nov. 16, 1954

INVENTOR.
Wilbert E. Beller
BY Nathan N. Kraus
Frank H. Marks
ATTYS.

2,914,086
Patented Nov. 24, 1959

2,914,086

VALVE DEVICE

Wilbert E. Beller, Park Ridge, Ill., assignor, by mesne assignments, to Controls Company of America, Schiller Park, Ill., a corporation of Delaware Application November 16, 1954, Serial No. 469,207

2 Claims. (Cl. 137—544)

My invention relates to an improved valve device.

One of the objects of my invention is the provision of a valve device embodying a pilot aperture and operative so that a relatively large valve seat may be opened or closed against line pressure with a relatively small force.

Another object of my invention is the provision in a valve device of the foregoing character of means for filtering only the fluid passing through the pilot aperture where in general such treatment is required, thereby avoiding the necessity for filtering all of the fluid passing through the valve in order to protect the aperture against clogging.

A further object of my invention is the provision of a valve device having means for utilizing pressure differentials for effecting opening and closing of the valve seat.

A still further object of my invention is the provision of a valve device which is simple in construction, efficient in operation and durable in service.

Other and further objects and advantages of my invention will become apparent from the following description when considered in connection with the accompanying drawings, in which.

Figure 1:
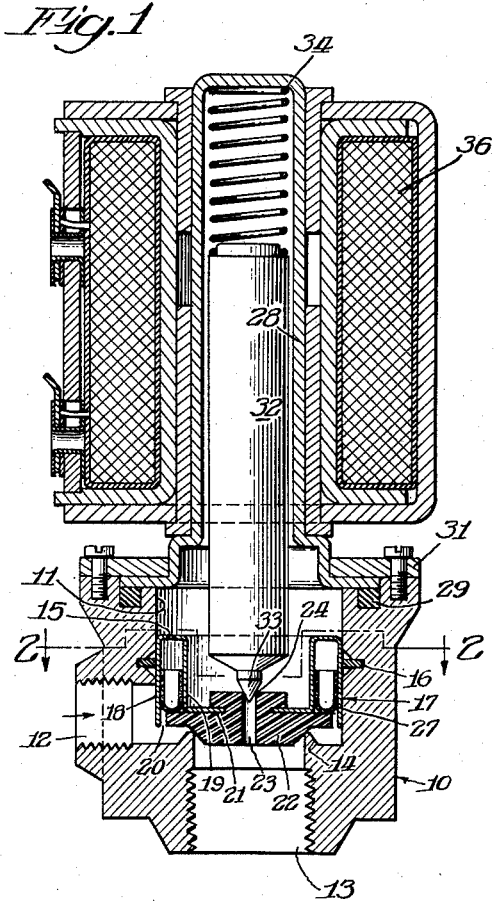
Fig. 1 is a vertical cross-sectional view of a valve device in accordance with my invention and showing the same in closed position.

Referring to the drawings, my invention comprises a valve body 10 having a bore 11, an inlet port 12 and an outlet port 13 communicating with the bore. The bottom of the bore 11 is suitably formed to provide a valve seat 14. The wall of the bore 11 is undercut substantially intermediate its ends to receive a resilient ring 16 which affords some sealing engagement with the piston indicated generally by 17 and presently to be described. The said piston includes an annular cup member formed with concentric vertical walls 18 and 19 connected at the tops thereof and with the inner wall 19 having an integral horizontal flange 21 forming a central aperture. A bleed aperture 15 in the piston affords communication between the inlet port 12 and the bore 11. Depending from the flange 21 is a resilient valve face element 22 having an undercut in which is received the marginal edge of the flange 21. The valve face element 22 is of course circular, and its peripheral edge terminates short of the outer vertical wall 18 so as to provide an annular passage 20 for fluid. The valve face element 22 overhangs the valve seat 14 to provide a surface area against which pressure fluid may act, as will be hereinafter described. The valve face element 22 is provided with a central aperture 23 providing a pilot aperture or passage and valve seat 24. Received within the annular space between the concentric walls 18 and 19, is a wire mesh filter 27 shaped in cross-section substantially like that illustrated, the said filter being retained within the annular spacing by the resilient valve face element 22. The piston 17 is capable of movement within the bore 11, so that engagement or disengagement of the valve face element 22 with the valve seat 14 may be effected as will be hereinafter described.

Figure 3:
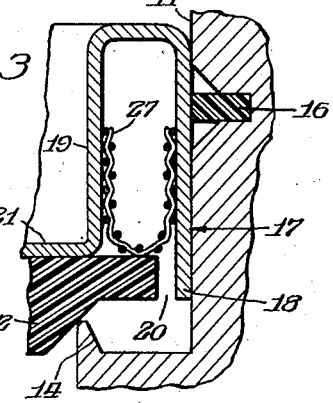
Fig. 3 is a fragmentary cross-sectional view of certain details of construction.

The bore 11 is closed by a flanged tubular member 28 abutting a gasket ring 29 and secured by a plate flange 31 which is secured as with screws to the valve body. Reciprocable within the tubular member 28 is a plunger 32, in the present instance a solenoid armature, one end of which is formed to provide a valve face 33 cooperating with the valve seat 24 of the pilot aperture 23. The said plunger is biased as by a spring 34 in a direction to effect sealing engagement of the valve face 33 with the valve seat 24. Surrounding the tubular member 28 is a field coil 36 of a solenoid which, when energized, effects upward movement of the armature 32, as illustrated in Fig. 3, to effect opening of the pilot valve seat 24 for a purpose as will be hereinafter described.

While the pilot valve face is shown as being actuated by a solenoid, it will be understood that my invention contemplates other mechanically, pneumatically or hydraulically operated means for effecting closure of the pilot aperture 23 of the valve face element.

Considering the valve in shutoff position with the solenoid deenergized, as illustrated in Fig. 1, and with the inlet port 12 connected to a fluid supply, it will be seen that fluid will enter the annular passage 20, pass through the wire mesh filter 27 and through the aperture 15 and into the bore 11. In this condition fluid pressure is acting on the entire upper surface of the piston 17 and also in an opposite direction on the surface area of the overhanging portion of the valve face element 22. Thus, fluid pressure is acting on an effective area equal to that of the main seat. When the valve is discharging into the atmosphere, it will be seen that the outlet port 13 is at zero gauge pressure. Under this condition the main valve seat 14 and the pilot aperture seat 23 are maintained in closed condition by the resultant force of the force of the spring 34, line pressure on the effective area of piston 17 and the effect of gravity on the moving parts.

Figure 4:
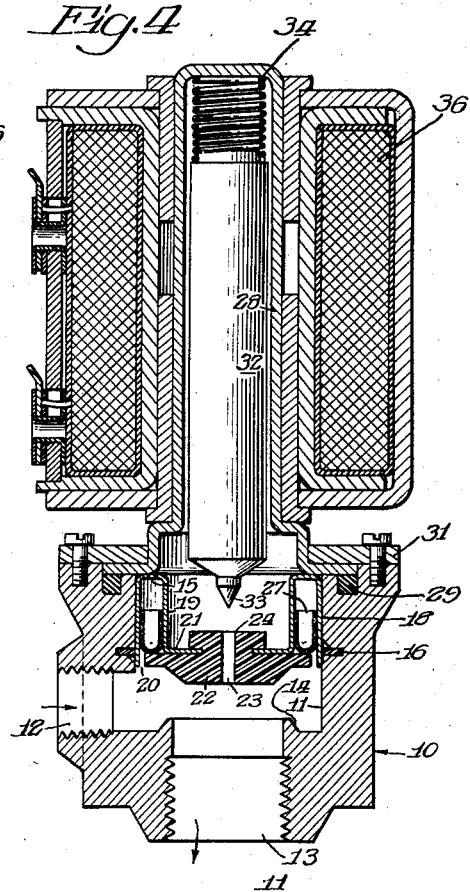
Fig. 4 is a view similar to Fig. 1, but showing the parts in open position.
Figure 2:
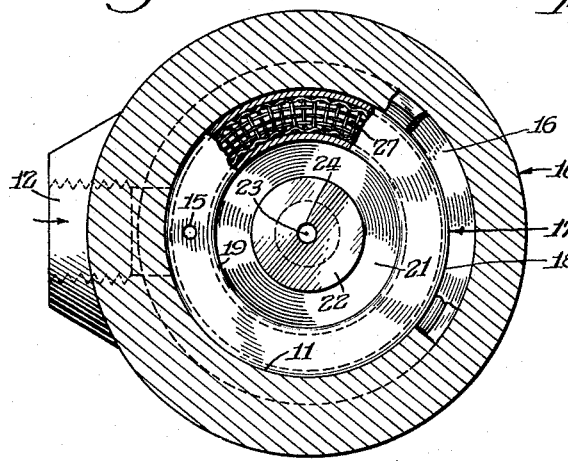
Fig. 2 is a cross-sectional view taken substantially on line 2—2 of Fig. 1.

In order to open the valve, the solenoid coil 36 is energized to lift the armature 32 to the position illustrated in Fig. 4, to open the pilot aperture 23 so that fluid may flow through said aperture into the outlet port 13 of the valve. The cross-sectional flow discharge area of the pilot aperture 23 is such that at all times it will pass a greater quantity of fluid than may pass into the bore 11 through the aperture 15. Accordingly, there is experienced in this condition a drop in the pressure acting on the upper surfaces of the top of the piston below that of the line pressure entering the inlet port 12. With line pressure, however, still acting on the under surface of the overhanging portion of the valve face element, there results a pressure differential which has the effect of displacing the piston from engagement with the seat 14 substantially to the position illustrated in Fig. 4, thus opening the main valve seat 14 and permitting the fluid to flow directly from the inlet port 12 to the outlet port 13 and discharge therethrough.

The valve is closed by deenergizing the solenoid coil 36, which causes the spring 34 to act on the plunger 32 to close the pilot aperture 23, trapping the pressure fluid passing through bleed aperture 15 within the bore 11 above the piston 17, so that pressure may be built up to line pressure within that portion of the bore. Since the average fluid pressure acting on the valve seat element 22 in the vicinity of the outlet port is below line pressure, a pressure differential is created in a downward direction, which causes the piston 17 to move downwardly to engage the valve seat 14 and thus effect closure of the outlet port. It will be seen that, as the piston 17 moves downwardly, the passage between the valve face element 22 and the valve seat 14 becomes progressively restricted. The flow of fluid is similarly progressively restricted, resulting in a progressive diminution of pressure fluid flow available to act on the under surface of the valve face element 22. Accordingly, as the piston moves to closing position, the pressure differential in a downward direction increases progressively, assuring rapid closing of the inlet port by the valve seat element of the piston.

Because the bleed and pilot apertures 15 and 23, respectively, are relatively small in cross-sectional area, it is highly desirable that the fluid passing through the valve be freed of any contaminants or foreign matter which would tend to clog these apertures. In the arrangement of my invention, the fluid which passes through these apertures is effectively filtered to prevent clogging thereof. Thus, only a relatively small amount of fluid passing through the valve is actually filtered and, accordingly, the valve may be used for extended service periods without the requirement for frequent periodic cleansing of the mesh screen filter element. It will be apparent that, in my invention, I have eliminated the necessity for straining or filtering all of the fluid passing through the valve.

Various improvements and modifications coming within the spirit of my invention will doubtless suggest themselves to those skilled in the art. Hence, I do not wish to be limited to the specific form shown or uses mentioned.

I claim:

1. A pilot operated pressure actuated valve comprising, a body having an inlet and an outlet with a bore aligned with the outlet, a piston in the bore, said piston comprising a centrally apertured member having a downwardly opening annular well around its periphery and slidably mounted in the bore, an annular filter element mounted transversely of the well, a resilient valve face mounted in the central aperture of the piston with its periphery partially overlying the annular well opening to retain the filter element in the well while leaving an annular flow path to the filter, a restricted, central aperture through said valve face, a valve seat at said outlet, said valve face adapted to seat on the valve seat, the piston being of greater diameter than the seat so an annular portion of the piston is always exposed to inlet pressure, a bleed hole through a wall of said piston of less cross sectional area than said restricted aperture and providing communication from said well above the filter element to the top side of the piston, a closed chamber above the piston, a valve cooperating with the restricted aperture of the valve face to control the pressure in said chamber.

2. A valve according to claim 1 in which the valve face has a central boss extending upwardly through the aperture in the piston member and of greater diameter than the aperture in the member, and an outwardly opening slot in the boss fitting over the member adjacent the opening in the member to retain the valve face on the member.

References Cited in the file of this patent
UNITED STATES PATENTS

| | | |
|---|---|---|
| 991,230 | Noyes | May 2, 1911 |
| 1,624,130 | Beggs | Apr. 12, 1927 |
| 1,868,520 | Brooks | July 26, 1932 |
| 2,016,460 | Sorensen | Oct. 8, 1935 |
| 2,087,356 | Parker | July 20, 1937 |
| 2,251,441 | Dillman | Aug. 5, 1941 |
| 2,285,323 | Beekley | June 2, 1942 |
| 2,712,324 | Lund | July 5, 1955 |